United States Patent [19]
Aoki

[11] 4,158,327
[45] Jun. 19, 1979

[54] MOLD CLOSING DEVICE OF INJECTION MOLDING MACHINE

[76] Inventor: Katashi Aoki, 6037, Ohazaminamijo, Sakakimachi, Hanishinagun, Nagano-ken, Japan

[21] Appl. No.: 836,217

[22] Filed: Sep. 23, 1977

[30] Foreign Application Priority Data

Sep. 30, 1976 [JP] Japan .................. 51/117470

[51] Int. Cl.$^2$ .................. B29C 3/00; F15B 11/18
[52] U.S. Cl. .................. 91/519; 425/451.2; 425/590
[58] Field of Search .................. 91/411 A, 438, 519; 60/425; 425/451, 450.1, 451.2, 590; 251/31

[56] References Cited

U.S. PATENT DOCUMENTS

| | | | |
|---|---|---|---|
| 1,750,417 | 3/1930 | McClellan et al. | 251/31 X |
| 2,676,611 | 4/1954 | Page | 251/31 X |
| 2,926,883 | 3/1960 | Prybylski et al. | 251/31 X |
| 3,786,725 | 1/1974 | Aoki | 91/411 A |
| 3,916,766 | 11/1975 | Huelskamp | 91/411 A |
| 3,935,791 | 2/1976 | Hehl | 91/411 R |

*Primary Examiner*—Irwin C. Cohen
*Attorney, Agent, or Firm*—Weingarten, Maxham & Schurgin

[57] ABSTRACT

A mold closing device of an injection molding machine is disclosed which is reliable in operation and simple in structure. Both the opening and closing of the valve for hydraulic oil passage can be attained in the mold closing device of the invention in which two valve controlling oil chambers are formed in the boundary between the valve member and a quick shifting ram. One of the above oil chambers is connected to a forward cylinder and the other, to a return cylinder, thereby attaining the opening and closing of valve by hydraulic pressure in synchronism with the movement of a mold closing piston which is attached to the quick shifting ram.

5 Claims, 6 Drawing Figures

MOLD CLOSING DEVICE OF INJECTION MOLDING MACHINE

BACKGROUND OF THE INVENTION (1) Field of the Invention

This invention relates to a mold closing device of an injection molding machine. More particularly, the invention relates to a mold closing device in which the hydraulic pressure resistance in the direction of the movement of a mold closing piston is reduced so as to promote the speed of opening and closing of the injection mold.

(2) Description of the Prior Art

There are several well known mold closing devices in which oil passages are formed in the mold closing piston of a mold closing cylinder and the oil passages are opened by means of valves, thereby reducing the hydraulic pressure resistance in the oil chamber on the lower pressure side when the mold closing piston is moved.

In almost all of them, however, either the opening or closing of valves has been done by hydraulic pressure, while it has been regarded as rather disadvantages in view of structural and economic reason for both the opening and closing of valves to be carried out by hydraulic pressure. Further, even if such an invention has been already made, it has never been put into practice.

SUMMARY OF THE INVENTION

It is therefore, the primary object of the present invention to provide an improved mold closing device of an injection molding machine with which both the opening and closing operations of the valve for hydraulic oil passages comprised of oil ports can be carried out by hydraulic pressure.

Another object of the present invention is to provide a mold closing device which is easy and reliable in operation.

A further object of the present invention is to provide a mold closing device which is simple in structure and durable for repeated use over a long period of time.

Still a further object of the present invention is to provide a mold closing device described above which can be produced without difficulty at low cost.

According to the present invention, the opening and closing operation of the oil controlling valve is done by hydraulic pressure, which has been regarded as practically impossible in the conventional art. In the small space between the valve member and a quick shifting ram slidably carrying the valve member, two valve controlling oil chambers are formed which give hydraulic pressure to the valve in turn. The above two oil chambers are supplied with a part of the hydraulic oil which drives a mold closing piston, so as to open and close the valve accurately. Thus, when the mold closing piston is moved, the oil ports defined in the mold closing piston are quickly opened by the action of the valve and the oil pressure in the driving oil chamber on the lower pressure side is reduced to promote the mold opening or closing operation.

The valve controlling the passage of hydraulic oil is of a disk type comprising a cylindrical portion having an inner annular shoulder and an annular groove, and a disk portion integrally formed with the cylindrical portion. The cylindrical portion of the valve is slidably fitted around the root portion of a quick shifting ram also having a shoulder. One of the valve controlling oil chambers is formed between the above two shoulders and the other valve controlling oil chamber is formed by the above annular groove in the cylindrical portions of the valve

BRIEF DESCRIPTION OF THE DRAWINGS

Further specific features and advantages of the invention will become apparent from the description following below, when taken together with the accompanying drawings which illustrate, by way of example, a typical embodiment of the invention represented in the various figures as follows.

DESCRIPTION OF THE PREFERRED EMBODIMENT

Figure 1:
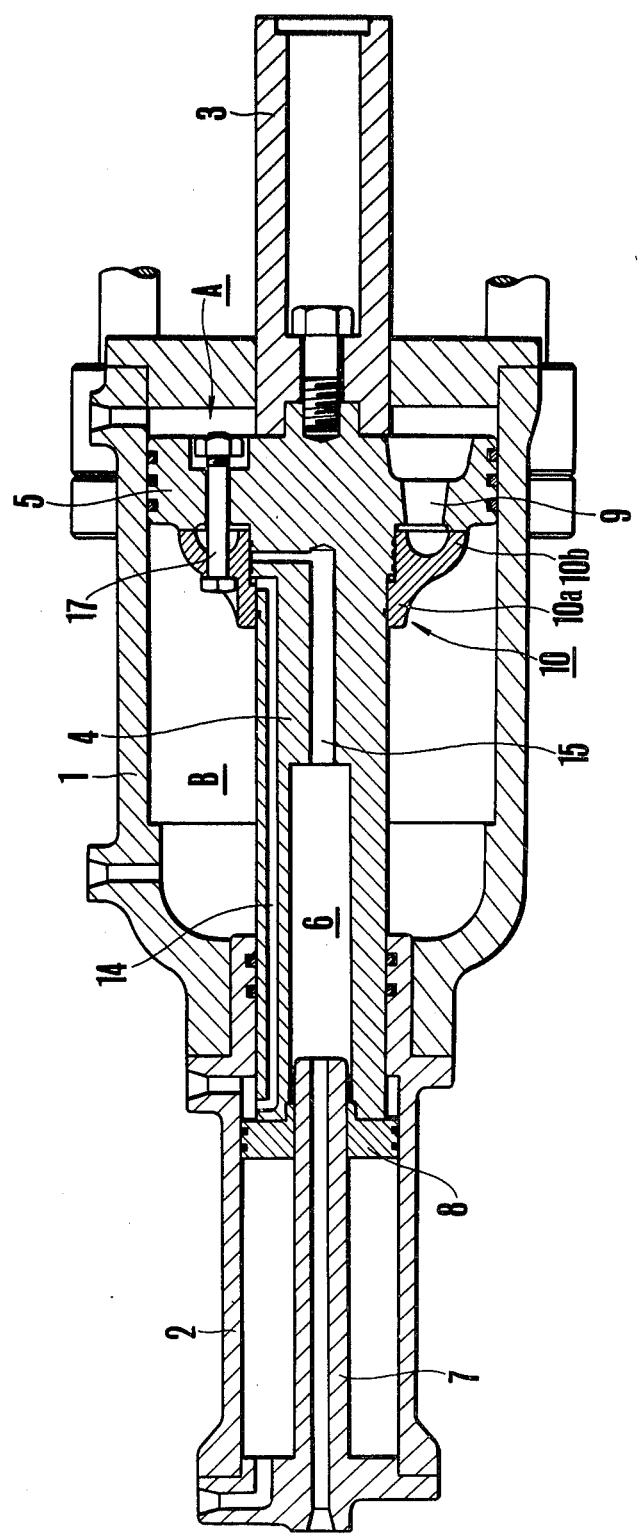
FIG. 1 is a horizontal cross-sectional view of the embodiment of a mold closing device of an injection molding machine, in which the mold is omitted, and a mold closing piston is moved forward to the completely mold closing position with a disk valve being closed.

Referring to the accompanying drawings, a preferred embodiment of the present invention will now be described in more detail.

The drawings show a hydraulic mold closing device for an injection molding machine which is made according to the present invention. As in common cylinders, a mold closing cylinder 1 has a circular cross-section and is provided with a quick-return cylinder 2 at its rear end. The mold closing cylinder 1 is provided with a mold closing piston 5 therein, the front side of piston 5 being connected to a mold closing ram 3 that is attached to a movable plate (not shown) of the mold. The rear side of the piston 5 is connected to a quick shifting ram 4, and thus the mold closing cylinder 1 is divided into two oil chambers A and B by the mold closing piston 5.

The quick shifting ram 4 is reciprocated between the mold closing cylinder 1 and the quick return cylinder 2, and is provided at its rear end with a return piston 8. In the rear part of the quick shifting ram 4 is formed a forward cylinder 6 into which a booster ram 7 that is held in the quick return cylinder 2, is inserted through the return piston 8.

A plurality of oil ports 9 is formed in the mold closing piston 5 so that the above-mentioned oil chambers A and B communicate with each other. All of the oil ports 9 may be opened or closed by a disk valve 10 which is fitted onto the side of the piston 5 facing the oil chamber B.

Figure 4:
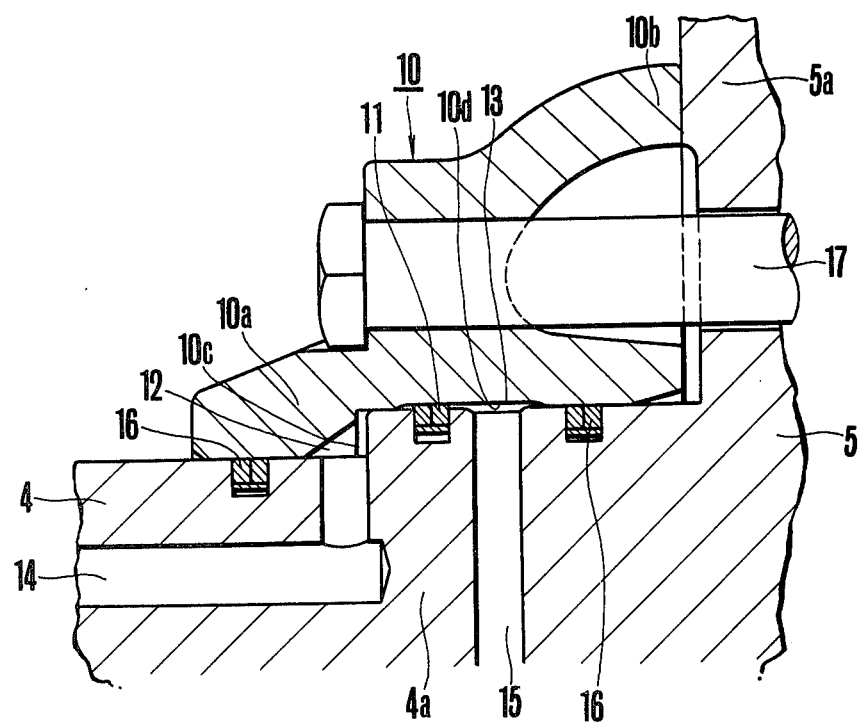
FIG. 4 is an enlarged horizontal cross-sectional view of a part of the disk valve showing valve controlling oil chambers.
Figure 5:
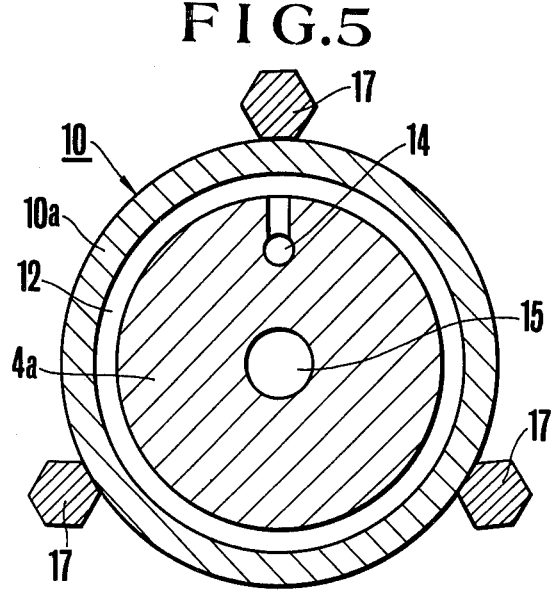
FIG. 5 is a vertical cross-sectional view of the root portion of a quick shifting ram taken along the line V—V in FIG. 3.
Figure 6:
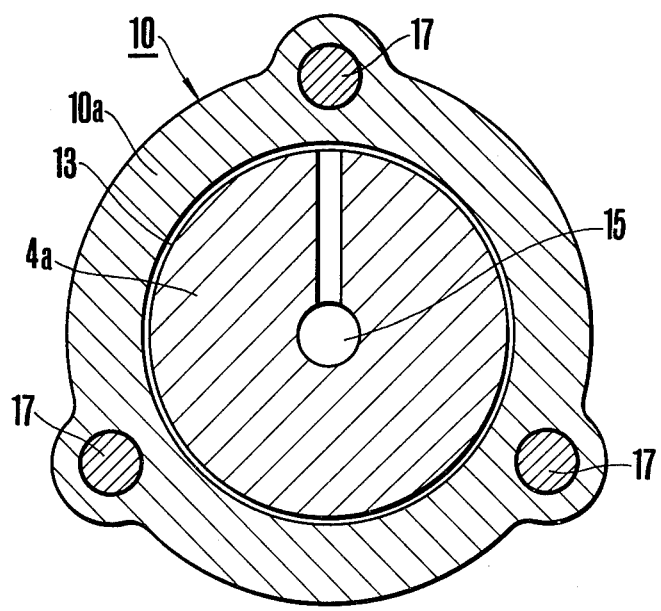
FIG. 6 is a vertical cross-sectional view of the same taken along the line VI—VI in FIG. 3.

This disk valve 10 is composed of a cylindrical portion 10a and a conical disk portion 10b which is integrally formed around the cylindrical portion 10a. Inside the above cylindrical portion 10a is formed a shoulder 10c as shown in FIG. 4, having the same height as that of the shoulder formed around the root portion 4a of the quick shifting ram 4. The open end (right side) of the conical disk portion 10b has an inner tapered face and between the inner tapered face and the foregoing shoulder 10c, a shallow annular groove 10d is formed.

The disk valve 10 having the above-described construction is slidably fitted to the root portion 4a of the quick shifting ram 4 before the return piston 8 is attached to the other end of the quick shifting ram 4. The oil space formed between the inside wall of the disk valve 10 and the root portion 4a of the quick shifting ram 4 is divided into two chambers by a piston ring 11 which is previously fitted. That is, one is a valve opening oil chamber 12 and the other is a valve closing oil chamber 13.

Within the quick shifting ram 4 are formed a hydraulic oil passage 14 which connects the quick return cylinder 2 to the valve opening oil chamber 12, and a hydraulic oil passage 15 which connects the quick forward cylinder 6 to the valve closing oil chamber 13. The disk valve 10 is moved back and forth by the hydraulic oil supplied from the above-mentioned cylinders.

The piston ring 11 which partitions the above-mentioned oil chambers and other piston rings 16 which seal the oil chambers 12 and 13 are disposed around the root portion 4a of the quick shifting ram 4. As the fitting diameter of the root portion 4a can be slightly varied, the disk valve 10 can be movably fitted to the root portion 4a and the above cylindrical portion 10a is serviceable as a movable cylinder. Further, with such a structure, the above-mentioned oil chamber 12 for valve opening having a larger volume and another oil chamber 13 for valve closing having a smaller volume are defined.

The conical disk portion 10b that is integrally formed with the cylindrical portion 10a, is provided with a flat face which comes into contact with the annular valve seat 5a formed around the oil ports 9 of the mold closing piston 5. The mold closing piston 5 and the disk valve 10 are movably connected by proper number of pins 17, with which the valve opening is restricted to a certain range.

The function of the above-described apparatus will be described in the following.

Figure 2:
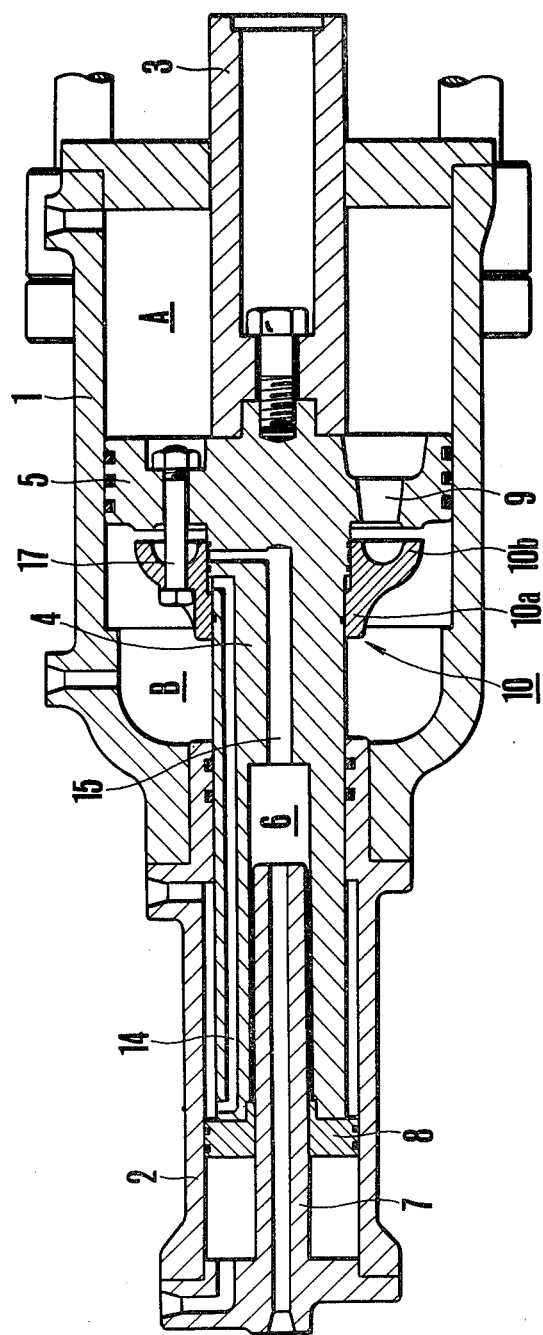
FIG. 2 is also a horizontal cross-sectional view of the same, in which the mold closing piston is retracted to the mold opening position and the disk valve is opened.
Figure 3:
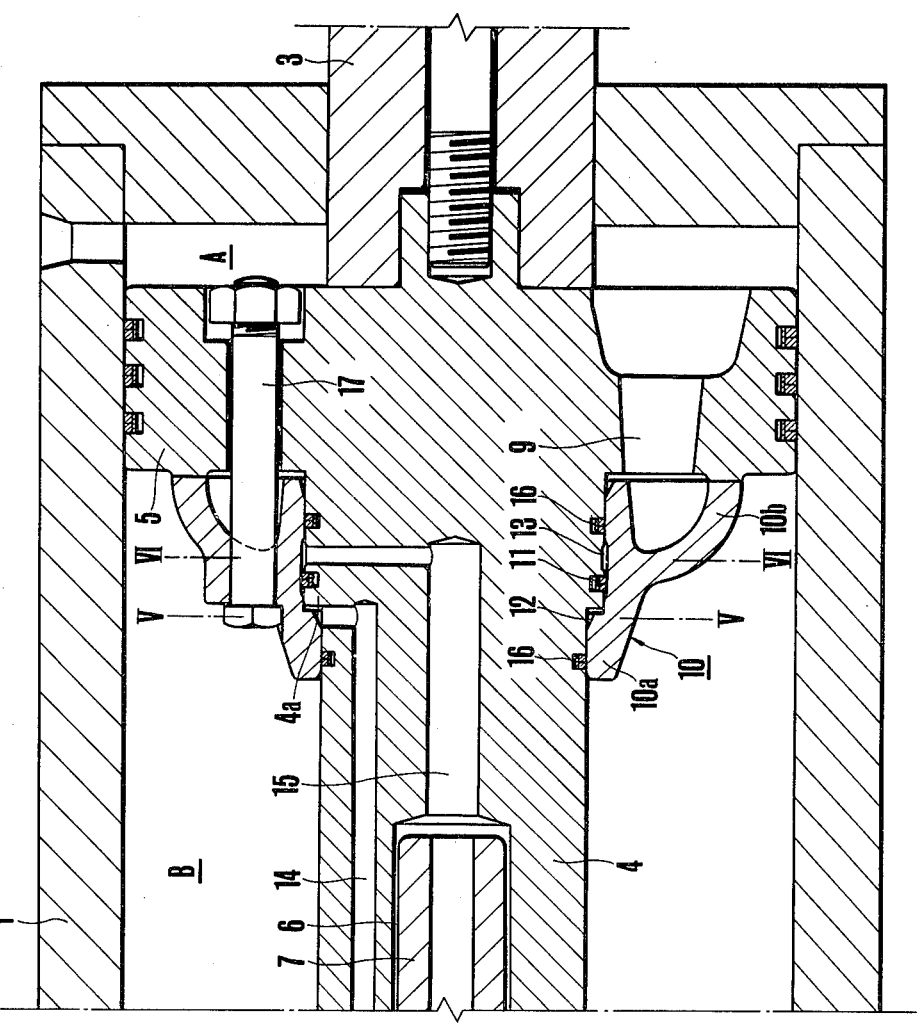
FIG. 3 is a horizontal cross-sectional view of the mold closing piston with the disk valve being closed.

When the mold closing piston 5 in FIG. 2 is moved forth quickly into the mold closing position in FIG. 1, hydraulic oil is supplied into the quick forward cylinder 6 through the booster ram 7. In this operation, the quick return cylinder 2 and the oil chamber A of the mold closing cylinder 1 are left open so as to allow the hydraulic oil to flow out with the movement of the mold closing piston 5. By the oil pressure in the quick forward cylinder 6, the quick shifting ram 4 as well as the mold closing piston 5 and the mold closing ram 3 are moved forward all together. At the same time, the oil pressure is applied to the valve closing oil chamber 13 and the force in the valve closing direction is exerted to the disk valve 10. However, the oil pressure within the oil chamber A caused by the forward movement of the mold closing piston 5 is very large and the oil pressure acts upon the disk portion 10b through the oil ports 9, therefore, the disk valve 10 is kept open and a part of the hydraulic oil in the oil chamber A flows into the oil chamber B. As the result, the resistance by the oil pressure in the oil chamber A can be reduced and the rapid forward movement of the mold closing piston 5 is facilitated.

When the above mold closing piston 5 is shifted to a predetermined position, the operation is changed into mold clamping, so that, the supply of hydraulic oil to the forward cylinder 6 from the booster ram 7 is restricted and the speed is slowed down. With this slowdown, the pressure in the oil chamber A becomes a small and the pressure exerted to the disk valve 10 is also reduced. When the force caused by the hydraulic oil in the valve closing oil chamber 13 overcomes the above force to the disk valve 10, the disk valve 10 is moved toward the mold closing piston 5, thus the disk portion 10b comes into contact with the valve seat 5a and the oil ports 9 are closed.

As a result, the two oil chambers A and B are completely separated and the clamping oil pressure that is applied to the oil chamber B is exerted to the mold closing piston 5 without leakage into the oil chamber A, thereby attaining the mold clamping with large power.

Further, when the mold is opened by retracting the mold closing piston 5 contrary to the above forward operation, the quick forward cylinder 6 and the oil chamber B are opened and the quick return cylinder 2 is supplied with the hydraulic oil. A part of this hydraulic oil that is supplied into the cylinder 2 acts on the valve opening oil chamber 12 through the hydraulic oil passage 14 and the disk valve 10 is moved back in the opening direction. Thus the oil ports 9 are opened and the two oil chambers A and B communicate with each other. This retraction of the disk valve 10 is effected in a short moment just before the retraction of the quick shifting ram 4 together with the mold closing piston 5 and the mold closing ram 3. Therefore, when the mold closing piston 5 is moved backward, the oil ports 9 have already been opened, so that the mold closing piston 5 can be quickly retracted without encountering the resistance of the hydraulic oil in the oil chamber B.

In the present invention described above, the valve closing oil chamber 13 communicating with the quick forward cylinder 6 and the valve opening oil chamber 12 communicating with the quick return cylinder 2 are formed by means of the partition of piston ring 11 between the quick shifting ram 4 and the disk valve 10 that regulates the oil ports 9 of the mold closing piston 5. The disk valve 10 is a double acting valve which responds to the oil pressure for operating the mold closing piston 5. Therefore, as compared with the case in which either the valve closing or the valve opening is done by hydraulic pressure, it is easier and more reliable to open the oil ports in mold closing and mold opening and to close them in the mold clamping. Further, since the valve closing is effected by the surface contact of the valve seat, the contact portions are not damaged even when a large mold closing force is exerted to the disk valve and the valve can be used for a long time without oil leakage caused by wearing under repeated uses. Furthermore, since a piston ring is used as the partition, the piston head which has been regarded as indispensable in the prior art, becomes unnecessary, and the oil chambers used to move the disk valve can be formed in a very small space.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. In a mold closing device of an injection molding machine having a mold closing cylinder, a mold closing piston located within said mold closing cylinder, a mold closing ram affixed to said piston extending toward an injection mold, a quick shifting ram affixed to said piston extending away from an injection mold in the direction opposite that of said mold closing ram, two chambers within said cylinder, one formed on either side of said piston, oil ports passing through said piston allowing communication between said chambers, and a disk valve slidably fitted to the base of said quick shifting ram for opening and closing said ports, said disk valve having a disk portion formed on the end of a cylindrical portion, said disk portion facing said ports, an hydraulic means for acutating said disk valve comprising:
   a piston ring secured to said quick shifting ram slidably engaging a portion of the inner surface of said disk valve and forming a seal between said inner surface of said disk valve and said outer surface of said quick shifting ram;
   a first valve controlling oil chamber formed between said inner surface of said disk valve and said outer surface of said quick shifting ram hydraulically actuable for urging said disk valve into a position opening said ports;
   a second valve controlling oil chamber formed between said inner surface of said disk valve and said outer surface of said quick shifting ram and sealingly separated from said first valve controlling oil chamber by said piston ring, said second valve controlling oil chamber being hydraulically actuable for urging said disk valve into a position closing said ports;
   a quick return cylinder axially disposed in the end of said mold closing cylinder facing away from an injection mold and hydraulically actuable for urging said piston in an axial direction away from an injection mold in a mold opening phase of operation;
   a forward cylinder formed in a cavity in the portion of said quick shifting ram facing away from an injection mold and hydraulically actuable for urging said piston in an axial direction toward an injection mold in mold closing and mold clamping phases of operation;
   a first oil passage allowing hydraulic communication between said quick return cylinder and said firt valve controlling oil chamber for applying hydraulic pressure to said first valve controlling oil chamber for urging said disk valve into said open position in said mold opening phase of operation; and
   a second oil passage allowing hydraulic communication between said forward cylinder and said second valve controlling oil chamber for applying hydraulic pressure to said second valve controlling oil chamber for urging said disk valve into said closed position in said mold clamping and said mold closing phases of operation.

2. In a mold closing device of an injection molding machine having a mold closing cylinder, a mold closing piston located within said mold closing cylinder, a mold closing ram affixed to said piston extending toward an injection mold, a quick shifting ram affixed to said piston extending away from an injection mold in the direction opposite that of said mold closing ram, two chambers within said cylinder, one formed on either side of said piston, oil ports passing through said piston allowing communication between said chambers, and a disk valve slidably fitted to the base of said quick shifting ram for opening and closing said ports, said disk valve having a disc portion formed on the end of a cylindrical portion, said disk portion facing said ports, an hydraulic means for actuating said disk valve comprising:
   a piston ring secured to said quick shifting ram slidably engaging a portion of the inner surface of said disk valve and forming a seal between said inner surface of said disk valve and said outer surface of said quick shifting ram;
   a first valve controlling oil chamber formed between said inner surface of said disk valve and said outer surface of said quick shifting ram hydraulically actuable for urging said disk valve into a position opening said ports;
   a second valve controlling oil chamber formed between said inner surface of said disk valve and said outer surface of said quick shifting ram and sealingly separated from said first valve controlling oil chamber by said piston ring, said second valve controlling oil chamber being hydraulically actuable for urging said disk valve into a position closing said ports;
   a quick return cylinder axially disposed in the end of said mold closing cylinder facing away from an injection mold and hydraulically actuable for urging said piston in an axial direction away from an injection mold in a mold opening phase of operation;
   a forward cylinder formed in a cavity in the portion of said quick shifting ram facing away from an injection mold and hydraulically actuable for urging said piston in an axial direction toward an injection mold in mold closing and mold clamping phases of operation;
   a first oil passage allowing hydraulic communication between said quick return cylinder and said first valve controlling oil chamber for applying hydraulic pressure to said first valve controlling oil chamber for urging said disk valve into said open position in said mold opening phase of operation;
   a second oil passage allowing hydraulic communication between said forward cylinder and said second valve controlling oil chamber for applying hydraulic pressure to said second valve controlling oil chamber for urging said disk valve into said closed position in said mold clamping and said mold closing phases of operation; and
   a plurality of setting pins fixedly mounted onto said piston and extending into and through said disk valve for restricting the axial movement of said disk valve on said piston to within predetermined limits.

3. The hydraulic actuating means recited in claim 2 wherein said first valve controlling oil chamber is further defined by an inner annular shoulder formed on said cylindrical portion of said disk valve and an outer annular shoulder formed on said quick shifting ram spaced from said inner annular shoulder in the axial direction.

4. The hydraulic actuating means recited in claim 3 wherein said second valve controlling oil chamber is further defined by an annular groove formed in said cylindrical portion of said disk valve.

5. The hydraulic actuating means recited in claim 2, wherein the volume of said first valve controlling oil chamber is larger than the volume of said second valve controlling oil chamber.

* * * * *